US009327292B2

(12) United States Patent
Yamamoto (10) Patent No.: US 9,327,292 B2
(45) Date of Patent: May 3, 2016

(54) PROCESS AND SYSTEM FOR DRY RECOVERY OF FINE AND SUPERFINE GRAINED PARTICLES OF OXIDIZED IRON ORE AND A MAGNETIC SEPARATION UNIT

(71) Applicant: New Steel Soluções Sustentaveis S.A., Rio de Janeiro (BR)

(72) Inventor: Mauro Fumyo Yamamoto, Rio de Janeiro (BR)

(73) Assignee: New Steel Soluções Sustentaveis S.A., Rio de Janeiro (BR)

( * ) Notice: Subject to any disclaimer, the term of this patent is extended or adjusted under 35 U.S.C. 154(b) by 0 days.

(21) Appl. No.: 14/386,574

(22) PCT Filed: Mar. 13, 2013

(86) PCT No.: PCT/BR2013/000075
§ 371 (c)(1),
(2) Date: Sep. 19, 2014

(87) PCT Pub. No.: WO2013/138889
PCT Pub. Date: Sep. 26, 2013

(65) Prior Publication Data
US 2015/0076037 A1 Mar. 19, 2015

(30) Foreign Application Priority Data
Mar. 19, 2012 (BR) .............. 102012008340

(51) Int. Cl.
*B03C 1/30* (2006.01)
*B03C 1/10* (2006.01)
*B03C 1/247* (2006.01)
(Continued)

(52) U.S. Cl.
CPC ... *B03C 1/30* (2013.01); *B03B 9/00* (2013.01); *B03C 1/10* (2013.01); *B03C 1/247* (2013.01); *B04C 9/00* (2013.01); *B03C 2201/20* (2013.01)

(58) Field of Classification Search
CPC ............ B03C 1/10; B03C 1/30; B03C 1/247; B03C 2201/20; B04C 9/00; B04C 5/26
USPC .......................... 209/710, 711, 219, 3, 38, 39
See application file for complete search history.

(56) References Cited

U.S. PATENT DOCUMENTS 3,021,951 A * 2/1962 Holt .............................. 209/221
3,441,135 A * 4/1969 Lapple .......................... 209/712
(Continued)

FOREIGN PATENT DOCUMENTS

DE     19605546 A1 *  8/1997
EP      2128279 A1    12/2009
(Continued)

*Primary Examiner* — Patrick Cicchino
(74) *Attorney, Agent, or Firm* — Brinks Gilson & Lione (57) ABSTRACT

The present invention refers to a system and method for the totally dry treatment of iron-ore wastes from previous mining operations, suitable for both the processing of ore wastes deposited in barrages and wastes stored in piles. The present invention solves the problems of magnetic separation processes that employ the wet and waste-dewatering way, eliminating the risks which throwing solid wastes into retention barrages bring by a system and method wherein the moisture degree of the ore is reduced by means of a mechanical stir dryer (using natural gas to prevent contamination), which is then sorted into various factions and finally separated magnetically, with the important difference of being an entirely dry process.

6 Claims, 5 Drawing Sheets

(51) Int. Cl.
  *B04C 9/00* (2006.01)
  *B03B 9/00* (2006.01)

(56) References Cited

U.S. PATENT DOCUMENTS

| | | | |
|---|---|---|---|
| 3,524,594 A | 8/1970 | Ingvar et al. | |
| 3,754,713 A * | 8/1973 | Kienast et al. | 241/19 |
| 4,016,071 A * | 4/1977 | Paterson | 209/39 |
| 4,222,529 A * | 9/1980 | Long | 241/77 |
| 4,317,717 A * | 3/1982 | Nakajima | 209/212 |
| 4,895,642 A * | 1/1990 | Frei | 209/127.3 |
| 5,035,331 A * | 7/1991 | Paulson | 209/3 |
| 5,067,659 A | 11/1991 | Heeren et al. | |
| 5,106,486 A * | 4/1992 | Hettinger | 208/124 |
| 5,139,203 A | 8/1992 | Alavi | |
| 5,394,991 A * | 3/1995 | Kumagai et al. | 209/212 |
| 5,626,233 A * | 5/1997 | Wells, II | 209/219 |
| 5,736,113 A * | 4/1998 | Hazen et al. | 423/206.2 |
| 6,942,709 B2 * | 9/2005 | Trautmann et al. | 55/346 |
| 7,159,723 B2 * | 1/2007 | Hilpert et al. | 209/710 |
| 8,056,728 B2 * | 11/2011 | Riise et al. | 209/8 |
| 8,757,390 B2 * | 6/2014 | Masferrer Salas | 209/213 |
| 2004/0217040 A1 | 11/2004 | Oder et al. | |

FOREIGN PATENT DOCUMENTS

| | | | | |
|---|---|---|---|---|
| EP | 2604347 A1 * | 6/2013 | | |
| WO | WO 2005/105316 A1 | 11/2005 | | |
| WO | WO 2006/041281 A2 | 4/2006 | | |
| WO | WO 2009153980 A1 * | 12/2009 | | B24B 55/03 |

* cited by examiner

PROCESS AND SYSTEM FOR DRY RECOVERY OF FINE AND SUPERFINE GRAINED PARTICLES OF OXIDIZED IRON ORE AND A MAGNETIC SEPARATION UNIT

CROSS-REFERENCE TO RELATED APPLICATIONS

This application claims the benefit of priority to PCT/BR2013/000075, filed Mar. 13, 2013, which claims priority to Brazilian Patent No. BR102012008340-0, filed Mar. 19, 2012, the entire contents of which is incorporated herein by reference.

The present invention refers to a process and a system for dry recovery of fine and superfine-grained oxidized iron ore from iron-mining waste basins (also known as tailings). The invention further deals with a magnetic separation unit to separate the fine-grained oxidized iron ore (generally in the form of hematite) using a dry process.

In this regard, the present invention aims to improve the recovery of iron ore still contained in mining dumps, often considered as waste, by providing high metallurgical and mass recoveries. Thus, it is possible to obtain a commercially superior product, more precisely an oxidized iron ore concentrate with Fe-contents higher than 63%. Such result represents a significant advance from the environmental point of view, if one considers the risk that is historically represented by wastes of the mining industry in Brazil and in the rest of the world.

The innovatory characteristics of the dry process in the present invention advantageous and simultaneously meet the economical, environmental and strategic requirements of the mining industry, enabling the improved recovery of the ore wastes that constitute a risk of high environmental impact, changing them into commercial products in a technically and economically feasible manner. In this dry process no water is used, and the final residue will be a stack of waste, without the need to further waste tailings.

DESCRIPTION OF THE PRIOR ART

At the beginning of the mining activities on an industrial scale, little was known about the techniques for waste disposal. The low interest in this area was still due to the fact that the amount of generated waste was reasonably small and the environmental problems were not yet part of the operational concerns of the industry.

In this regard, the waste was usually thrown at into water streams in a random manner. However, with the expansion of the mining sector, the growing social concern about the environmental issues, as well as the occurrence of a few accidents involving waste retention tailings since the 1970's in various parts of the world, including Brazil, the challenge of guaranteeing the operation of the industrial units was imposed on the mining companies with a view to minimize the environmental impacts and to reduce the risks of accidents, through more secure and optimized projects.

In general, three techniques are used for disposing mining wastes, namely:
 by wet way in tailings,
 by dry way in waste stacks, or
 by using the paste-fill technology.

The difference between the wet-way disposal and the dry-way disposal is that, in the wet way at tailings, there is also retention of liquids along with the solid material discarded. High intensity magnetic separation is traditionally adopted for continuous flow of material, operating normally wet, a process known intentionally as WHIMS—Wet High Intensity Magnetic Separation.

The paste-fill disposal is an alternative to conventional practices, with advantages like greater recovery and recirculation of water, larger resting angles and reduced environmental impact. However, this process is carried out at high implantation and operation costs.

For instance, the Brazilian Patent Application BR PI 0803327-7 discloses a magnetic concentration process with low consumption of water and low generation of waste slurry. The wet magnetic separation and disposal of the magnetic waste may decrease the release of large volumes of solid waste into decantation tailings. However, this process does not deal with the waste recovery. So, there is no effective decrease in the environmental risk inherent of the mining activity.

Another document, the patent application BR PI0103652-1 describes a process of recovering residues from iron oxide. These residues may be obtained directly by recovering fines from metallurgy reduction processes, as well as the deviation of return of fines from companies that supply iron ore to iron and steel companies. The material is loaded onto a feed silo and follows through chutes and conveyor belts into a rotary drying oven. The dry material is unloaded for stock without passing through any sorting/concentration process or it is led directly to the reduction furnaces by a conveyor-belt system.

With regard to the step of drying/disaggregating the waste for subsequent separation, the prior art usually employs a rotary drum dryer. By this technique, the presence of fines in the dryer results in formation of an expressive amount (30 to 50%) of pellets inside the dryer (which obviously is contrary to the objective of recovering fines), leading to a low efficiency rate of the equipment for coarse particles and even greater inefficiency for fine particles.

Fluid-bed dryers are recommended for coarse particles that enable the formation of fluid beds, but it is impossible to form a fluid bed for fine particles.

Spray Dry is widely used today in the ceramic industries especially in preparing masses for the process of manufacturing porcelain floors. However, in the Spray Dry, it is necessary to form a pulp with 50% solids for promoting the spraying of particles to be injected against a current of hot air. Feeding 500 ton/h of feedstock requires more than 500 m$^3$ of water, which makes the operational cost unfeasible.

As to the magnetic separation process usually employed in the prior art, one usually employs a magnetic roll equipment, or a high-intensity permanent magnet drum, the efficiency of which is satisfactory for separating materials dimensionally higher than 100 µm.

For materials with dimensions lower than 100 µm, the high-intensity magnetic roll separator, as it has been employed, has proved to be inefficient. This inefficiency results from the fact that, at the moment when the particles are expelled from the conveyor belt, the particle separation take place to the proportion between the magnetic and centrifugal forces to which the particles are subjected.

Thus, for particles with dimension lower than 100 µm, in most cases the magnetic force is higher than the centrifugal force, which also leads to the conduction also of non-magnetic particles to the zone intended for receiving magnetic particles.

In view of the average granulometric distribution of the material in waste basins with d50 of 27 microns, which means that 50% of the passing material is at 27 microns, and a d80 of 51 microns, which means that 80% of the passing material is at 51 microns, it is possible to consider an extremely fine material, difficult to dry by conventional methods.

Prior art reference U.S. Pat. No. 3,754,713, published on Aug. 28, 2013 is directed to the separation of metallic iron obtained from the reduction of ilmenite with carbon, provided with a rotating magnetic drum which does not have the required magnetic intensity to separate fines and superfines as aimed by the present invention.

Document U.S. Pat. No. 4,317,717, published on Mar. 2, 1982 discloses an equipment for recycling urban waste, and recyclable materials such as aluminum cans, wherein the magnets used therein are ferrite magnets (iron-boron) whereby the maximum intensity of 1,500 Gauss is not sufficient to separate the oxidized iron minerals, such as hematite ($Fe_2O_3$).

A further prior document, U.S. Pat. No. 3,021,951, refers to an inner drum magnetic separator with several magnet devices alternating north and south, which in the bottom of the drum collects the magnetic minerals of high magnetic susceptibility, such as metallic iron in the recycling of industrial and household waste, made of ferrite magnets (iron-boron), with a maximum intensity of 1,750 Gauss, thus with a magnetic field that is also insufficient to separate the oxidized iron minerals such as hematite.

U.S. Pat. No. 4,016,071 discloses a magnetic drum, developed for separation of metallic iron in metallic waste, similar to U.S. Pat. No. 4,317,717, built with ferrite magnets (iron-boron) and which, likewise, does not allow the attraction of iron minerals of low magnetic susceptibility that is the case of oxidized iron ores in general with particle size less than 150 microns.

Finally, prior art document U.S. Pat. No. 5,394,991 consists of an apparatus for generating eddy current, wherein the magnet rotor rotates at high rpm (+/−3500 rpm) and generates eddy current. This machine was designed for the recycling of non-magnetic conductive metals and magnetic metals wherein non-magnetic conductive metals include aluminum cans, brass, stainless steel and copper and non-conductive and magnetic metals, which consists of metallic iron with a high magnetic susceptibility. Its manufacturing cost is extremely high which prevents it from being applied in the iron mining industry. In addition, the magnets that form the magnet rotor, are made of solid bars of ferrite magnet, therefore, of low intensity that lacks sufficient force to attract the oxidized iron minerals (e.g., hematite), which characteristically present low magnetic susceptibility.

Objectives and Advantages of the Invention

According to the scenario set forth above, the present invention has the objective of providing a system and a process for dry recovery of fines and superfines of oxidized iron ore, which are highly efficient and do not have the environment drawbacks of processes and systems in use at present, which further have implantation and operation costs that are perfectly admissible to the industry.

In the same way, the present invention further aims at providing a magnetic separation unit that is efficient for materials that traditionally cannot be processed by conventionally employed magnetic roll separators.

Such objectives are achieved in an absolutely effective manner, reducing the potential risk for the environment in implanting the system, promoting a rational use of the natural resources, recovering the wastes that may represent environmental risk in case of accidents at the tailings and in stacks, and with a friendly interaction with the surrounding environment.

In terms of growing environmental demands, the present invention constitutes a definitive reply to the challenge of generating economic results in an environmentally sustainable manner, characterized chiefly by:

greater mass and metallurgical recovery of iron;
recovery of fines from iron ore in fractions <100 mesh (about 150 microns) without loss by hauling;
clean combustion, without residues;
non-existence of residues to the atmosphere;
more efficient separation of iron with generation of cleaner waste having lower iron contents;
logistic optimization with localized treatment;
preservation of water streams and aquifers;
minimization of the risk of accidents with tailings;
decrease in the physical space intended for implantation;
low energy consumption;
modularity and flexibility of the system;
increase in the lifetime of the mines.

As said before, the singularity of the solution of the present invention lies on adopting of an entirely dry mineral processing route, which requires the introduction of a drying unit prior to the feeding of the finest fractions into the magnetic separator.

The route that constitutes the mainstay of the present invention can be summarized as follows: the moisture degree of the ore is reduced by means of a mechanical stir dryer (using natural gas to prevent contamination or burning of biomass), which is then sorted into various fractions and finally separated magnetically, with the important difference of being an entirely dry process.

DETAILED DESCRIPTION OF THE INVENTION

Before initiating the description of the invention, it should be pointed out that the magnitudes set forth herein are given merely by way of example, so that they should not be taken as limitative of the scope of protection of the present invention. A person skilled in the art, in the face of the presently disclosed concept, will know how to determine the magnitudes suitable to the concrete case, so as to achieve the objectives of the present invention.

Figure 1:
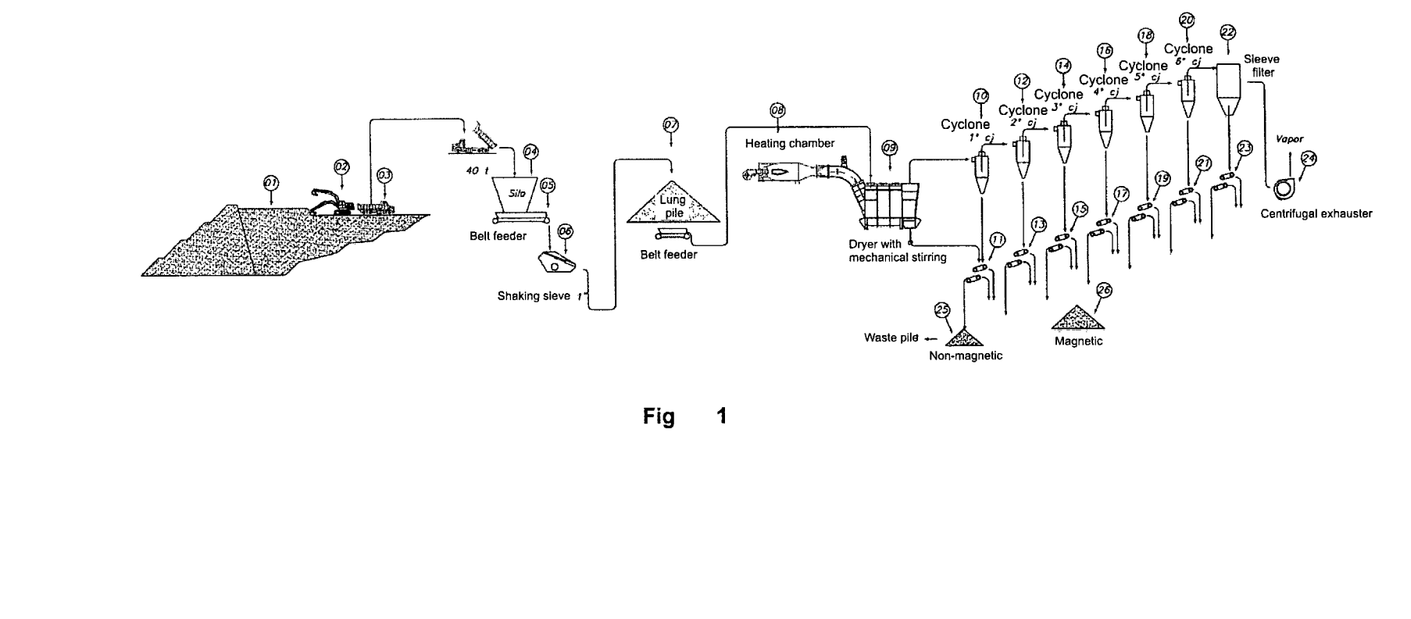
FIG. 1 shows a schematic diagram.
Figure 2:
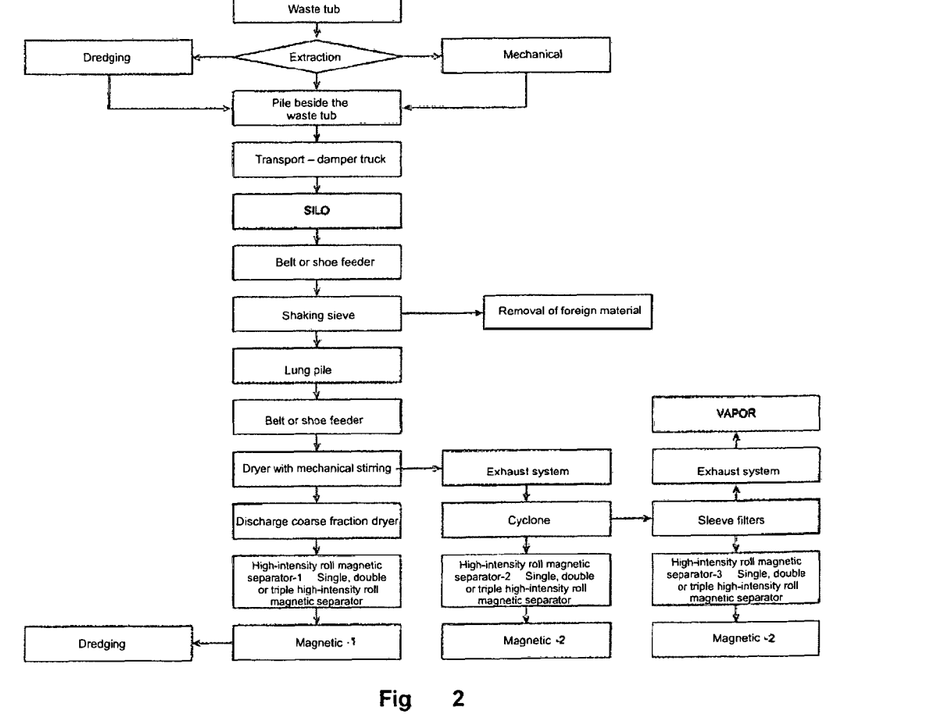
FIG. 2 shows an operational flowchart of the process.

In FIG. 1, the reference numbers 1 to 7 represent steps and components just as they are traditionally employed in the prior art, so that they do not incorporate the innovations brought by the present invention.

In this regard, there is a volume of material to be processed (1), which is extracted by an excavator (2) and placed in a truck bucket (3). The truck (3) feeds a silo or hopper (4), which is then led by a shaking conveyor (5) to a sieve (6) intended for caring out the preliminary separation.

The sieve (6) may consist of a shaking sieve for removal of contaminating material. In this way, the material is led to stockpile (7).

The capacity of said stockpile (7) can reach 2,000 tons of material, for instance.

Additionally, a mist curtain involving the hopper may be provided to prevent dust from falling on the external part of the hopper. In this regard, the belt conveyor may be completely enclosed, thus preventing possible loss of material and the consequent emission of dusts into the atmosphere.

Below the stockpile (7), there may be a duct comprising a shaking feeder (not shown), which transfers the ore to the belt conveyor.

From the belt feeder of the stockpile (7), the material is then led to the first one of the so-called three unitary operations that constitute the present invention. The first unitary operation is the particle drying/disaggregation process.

Figure 3:
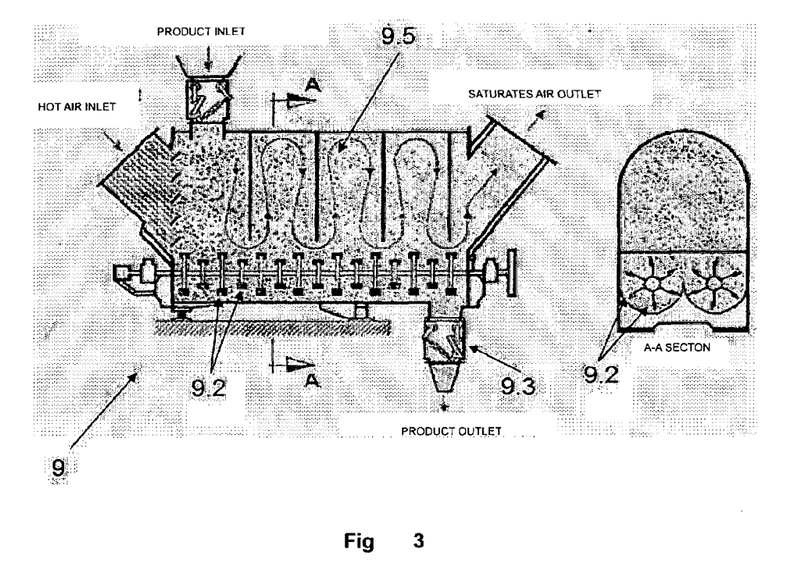
FIG. 3 shows a rapid dryer with mechanical stir/mechanical stir system used in the process and in the system of the present invention.

Hence, in order to solve the already mentioned problem of drying/disaggregation of fine particles, and to obtain particles 100% individualized to achieve maximum efficiency in the magnetic separation process, it is proposed the use of a rapid dryer (9) with mechanical stirring/mechanical stirring system, as shown in FIG. 3.

The dryer (9) is composed by a heating chamber (8), which generates hot air (maximum temperature around 1,100° C.) introduced in the main body, inside which two axles with propellers (9.2) are provided, which cause the movement of the particulates both vertically and horizontally. These gases go through a labyrinth system (9.5), which forces the heated air to come into contact with the material. The vertical movement of particles, besides promoting contact of particles with hot air to increase the efficiency of the drying process, further facilitates the removal of fines by the system of fine collection due to the negative pressure exerted by the exhauster (24). There is also an efficient disaggregation step of the so-called "fine-waste barrage". In this way, particles are moved horizontally, so that the dry material moves along the main body to the discharge point (9.3).

The dryer may be sized, for instance, for a capacity of 200 t/h, based on the characteristics of the material to be dried; the dryer may have, for instance, capability for drying, disaggregating and, at the same time, removing the fines. The volume of the material fed to the dryer that is lower than 100 mesh (about 150 microns) can reach up to 98% of the total.

The main characteristics of the dryer employed in the tests carried out are listed hereinafter:
  two rapid dryers, each dryer being equipped with two 150 HP motors; the assembly has two pendulum double sluice valves with reducing motor, each having power of 7.5 HP×2=15 HP, one being intended for feeding the product to the dryer and the other for discharging the fraction >100 mesh of the dried product. These valves prevent the entry of air in the system, as well as the exit of hot gas, thus keeping the performance at the temperature of the hot gases, that is, the thermal balance is excellent;
  two safety valves to each dryer, in case of the occurrence of explosion;
  two hot gas generators with ducts that interconnect the generator to the dryer, coated with refractory material. There are also inlet valves for cold air to keep the balance of the temperatures measured by thermocouples. These temperatures may be indicated and controlled in the panel;
  a set of cyclones and interconnecting ducts for output for gases and products, as well as helical threads with rotating valves. There is provided the support structure for the cyclones,
  a duct for interconnection of the cyclones to the sleeve filters 22, and threads for exit of the products, exhauster and chimney;
  an electric panel for the system, automation measuring and controlling instruments.

The dryer further has a complete powder aspiration system, wherein the powder is collected at different cycloning stages, thus preventing the particulates from escaping into the environment. As already said, in order to generate heat, natural gas is used, which together with the adequate control of the air flow, in a correct air/fuel ratio, provides clean and complete combustion, with the gases being discharged after passing through press filters.

Figure 4:
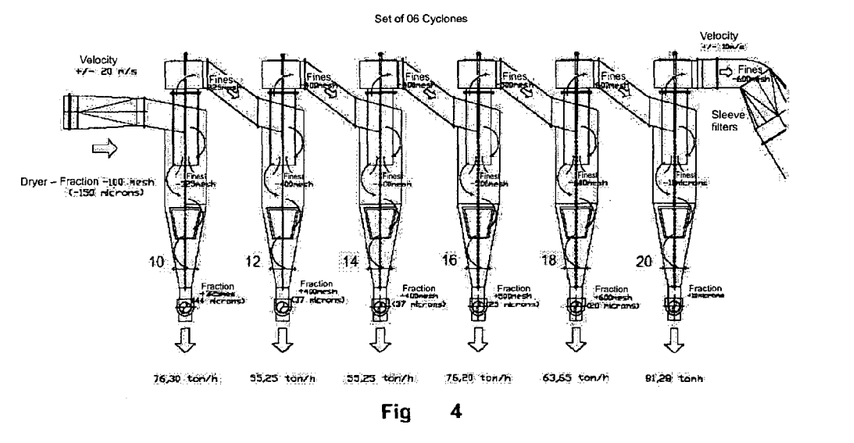
FIG. 4 shows an arrangement of the set of cyclones.

The process of removing the gases containing water steam and fines is carried out by a high-capacity exhauster arranged at the end of the circuit. Associated to the exhaustion system circuit, there is provided the component that integrates the so-called second unitary operation of the process of the present invention, which consists in air-sorting of 98% of fines fed. Such a component consists of at least one set of cyclones 10, 12, 14, 16, 18 and 20 connected in series, as shown in FIG. 4.

The cyclones collect the fines with different grain sizes. These cyclones will perform a selective and decreasing retention depending on the grain size of the material fed. Therefore, the first cyclone may be configured, for example, to have coarser particles, such as 44 μm, in the second and in the third, the grain size of the retained material would be about 37 μm, and gradually at each cyclone until the last cyclone with retention of finer particles up to 10 μm. The air-sorting takes place at the cyclones as a function of the loss of speed by each cyclone.

The grain distribution achieved with the exemplified arrangement in question is shown in Table 1 below.

TABLE 1

| Grain-Size Distribution - Exhaustion System - Cyclones | | |
|---|---|---|
| Grain Distribution - Exhaustion System - Cyclones | weight % | t/h |
| 1st cyclone (fraction −100 and +325 mesh) | 15.26 | 76.30 |
| 2nd cyclone (fraction −325 and +400 mesh) | 11.05 | 55.25 |
| 3rd cyclone (fraction −325 and +400 mesh) | 11.05 | 55.25 |
| 4th cyclone (fraction −400 and +500 mesh) | 15.24 | 76.20 |
| 5th cyclone (fraction −500 and +600 mesh) | 12.73 | 63.65 |
| 6th cyclone (fraction −600 and +10 microns) | 16.26 | 81.28 |
| 7th Sleeve filters (fraction −10 microns) | 16.26 | 81.30 |
| Totals | 97.85 | 489.23 |

Finally, with regard to the superfine particles, below 10 μm, they are aspirated and removed in a set of sleeve filters (22). The products collected at the different cyclones are intended for magnetic separation, to recover a magnetic product of high iron contents in the pellet sorting (fraction −100 mesh or 0.15 mm at zero mm).

The coarser fraction lower than 2 mm and higher than 0.15 mm is released at the dryer discharge. In order to prevent heat losses, the discharge is then controlled by two double-stage valves, the dried material is collected and transported by a conveyor belt to the magnetic separator.

With regard to the separation step, more specifically the magnetic separation, it consists of the third unitary operation of the process of the present invention.

The installed capacity of the magnetic separation unit is of up to 150 ton/h for each drying unit (without being limited to this value), comprising roller magnetic separator. At this stage, each fraction has a different treatment, as exemplified hereinafter

- the coarser fractions (fractions lower than 40 mm and higher than 6.35 mm and in the fraction lower than 6.35 mm and higher than 2 mm) are separated by the first and second magnetic high-intensity separators with roller diameter of 230 mm, equipment with magnetic intensity sufficient to retain particles of up to 40 mm on the surface of the magnetic roll;
- the intermediate fractions, lower than 2 mm and higher than 0.15 mm, will be separated by the third medium-intensity drum magnetic separator (6.500 gauss);
- finally, finer fraction, lower than 0.15 mm (about 150 microns), has their magnetic dry separation considered as a great operational difficulty, due to the dragging of non-magnetic fines along with the magnetic fraction, caused by the magnetic field lines. The field lines, when moved at a high speed, generate currents (Eddy Current).

This process is used to separate conducting metals, for example, in recyclable aluminum cans, representing an invisible and actuating force for the fine particles.

Hence, the present invention further provides a high-intensity magnetic roll separation equipment, exclusively for separating iron oxide fines at grain sizes of 0.15 mm to zero. At this magnetic separation, it is possible to obtain a product with high Fe (T) contents. For instance, in the test of ore sample, the recovered iron content was of 68.72%. Each of the products is collected at different containers for better utilization and blending with the products obtained.

Figure 5:
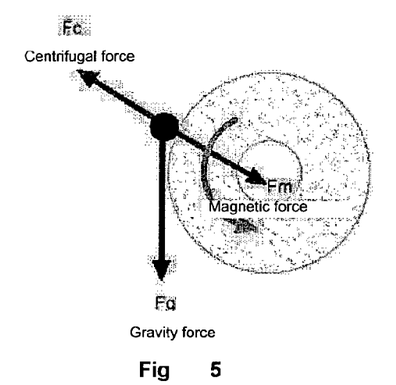
FIG. 5 shows a diagram of distribution of the forces actuating on the magnetic roll of a magnetic separation unit.

With regard to the functioning of said magnetic separation, this operation consists of a process in which two or more materials of different magnetic susceptibility are separated from each other. The main driving power is magnetic force (Fm). In addition to this force, other forces also actuate on the particles, such as the centrifugal force (Fc) and the gravity force (Fg), as shown in FIG. 5.

Thus, a particle is considered to be MAGNETIC when Fm>Fc+Fg and is considered to be NON-MAGNETIC when Fm<Fc+Fg. For coarser particles, higher than 15 µm, at the same speed, a centrifugal force is greater than that at a particle of 40 µm.

In this scenario, the magnetic separation of fine particles is usually considered a great difficulty or even impossible. Fine-grained particles exhibit low centrifugal force, as demonstrated in the formula below:

$$Fc = m \cdot v^2 / r$$

wherein:
Fc=centrifugal force
m=mass
v=velocity
r=radius.

Figure 6:
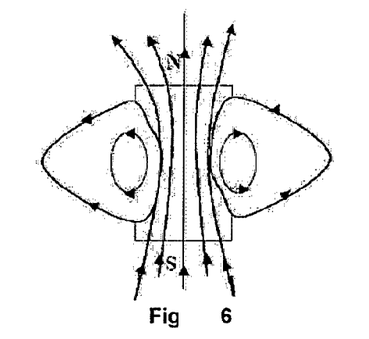
FIG. 6 shows a diagram of the magnetic field lines existing around a permanent magnet employed on the magnetic roll of a magnetic separation unit.

As will be recognized by those skilled in the art, fine particles, besides exhibiting lower centrifugal force, also undergo the influence of the magnetic field, so that the smaller their diameter the greater this influence. When this magnetic field is subjected to rotation, a conducting field is generated, which is known as Eddy Current, which tend to draw the non-magnetic metallic fine particles to the magnetic fraction. The lines of magnetic field created by a permanent magnet are shown in FIG. 6.

Figure 7:
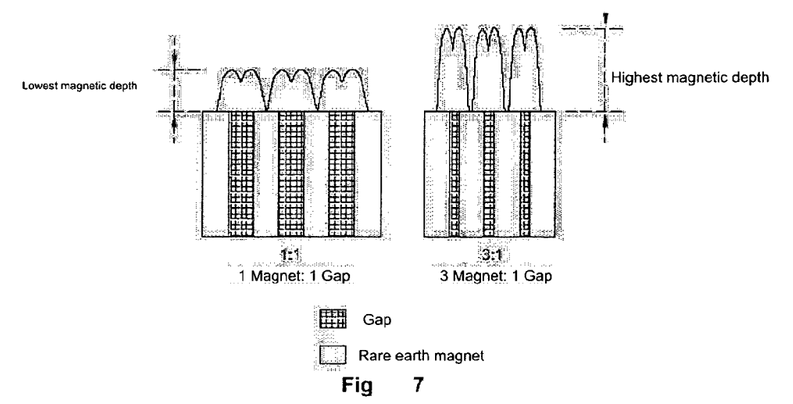
FIG. 7 is an illustrative diagram of the ratio of the field lines with the thicknesses of the magnets and the air gap.

The magnetic rolls used in the present invention are made by conjugating magnets having the same polarity (North) with a gap therebetween, thus creating magnetic field lines that alternate throughout the magnetic roll. The ratio between the magnetic thickness and the gap thickness is responsible for the depth of the magnetic field known as gradient, as demonstrated in FIG. 7.

Figure 8:
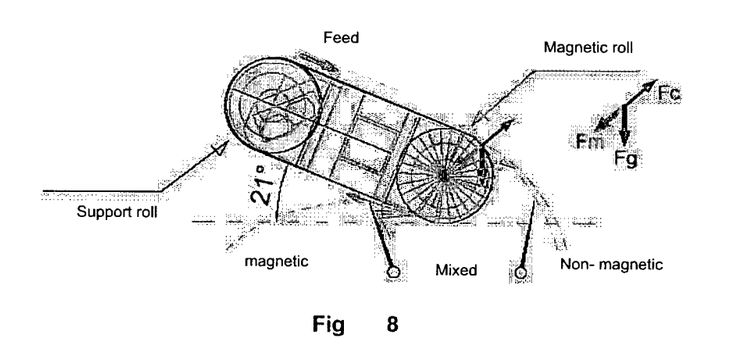
FIG. 8 is a scheme of the magnetic separation unit according to the present invention.

Thus, bearing in mind the fact that fine particles exhibit low centrifugal force as well as the drawing of the non-magnetic fraction to the magnetic fraction caused by the magnetic field lines, the present invention proposes a fine-separation scheme that has the objective of overcoming the limitations reported above. The scheme comprises inclining the magnetic roll, as shown in FIG. 8, to raise the particle speed, decreasing the contact area of the magnetic field and, as a result, contributing to the increase of the result of the centrifugal force and gravity force.

Besides, in order to increase the particle velocity so as to overcome the draw of the non-magnetic fraction, it was necessary to increase the magnetic field depth, as a ratio of 3:1 (magnetic thickness:gap thickness).

In this regard, the inclination angle may undergo a variation depending of the grain fineness, so that for finer particles the inclination angle may be greater. The variation of this angle will be easily determined by a person skilled in the art, as long as he is aware of the inventive concept disclosed in this patent.

The permanent-magnet roll separators exhibit the following characteristics, which provide selectivity to the magnetic separation process:
- low gradient;
- high magnetic intensity, maximum up to 13,000 gauss, the magnetic intensity may be higher or lower depending on the arrangement, the magnet thickness and the gap thickness;
- ratio of magnet of larger thickness versus gaps of smaller thickness provide higher magnetic intensity;
- Rare-Earth permanent magnet having in their composition 52% of neodymium, besides iron and boron. The magnetic saturation level is directly proportional to the amount of neodymium.

Other characteristics of this equipment are presented hereinafter:
- the magnetic roll is of the permanent type of high intensity, high gradient, built with superpotent neodymium magnets, resistant to temperatures of up to 80° C. and steel disc of high magnetic permeability;
- the actuation of the magnetic roll is effected by means of a complete, three-phase, variable-velocity 2.0 HP AC motor with frequency inverter for 220 VCA (VAC) 60 Hz, (it may be run on 220/380/440 (VAC)
- the belt tensioning and aligning system may solve the problem related to the short distance between small-diameter rolls of thin belt. It is possible to replace the belt in a few minutes, without the need for special tools. The employed three guide systems enable the tensioning and alignment of the belt, thus extending its lifetime;
- a separation belt of the type of polyester fabric coated with PU (Polyurethane) layer, with 0.6-1.00 mm thickness;
- roller-type feed system with a 2.0 HP, 220 VAC, three-phase driving motor with frequency inverter, for regulating the feed speed. It includes storage silo; this type of feeder enables more controlled and uniform feeding, especially for particles having different densities or formats, and is not sensitive to variations in the level of material in the silo. This is the main technical advantage over shaking feeders;
- support structure built with carbon steel profiles, with respective paint finish, making the assembly a compact and easy-to-install unit. Entirely powder-proof control panel, including measuring instruments, speed controllers, frequency inverters, feed voltage: 220 VAC, 60 Hz, three-phase.

However, all the above conditions and characteristics enable an improvement introduced in the unit, according to which the permanent-magnet roll magnetic separator is arranged with a determined angle with respect to the horizontal direction, so as to provide an additional force that sums to the centrifugal force and thus manages to retain non-magnetic materials in a satisfactory manner.

Such an arrangement may be viewed on the magnetic separators illustrated in FIG. 1 with reference numbers 11, 13, 15, 17, 19, 21 and 23.

The mentioned low gradient results from the magnetic depth resulting due to the arrangement of the magnets and gaps.

EXAMPLE 1

Analysis of Waste Sample

With a view to make a physicochemical characterization of a known stack of wastes, to attest the efficiency of the technology of the plant of the present invention in its dry processing, and with the highest recovery possible of the iron oxide contained therein, samples of said stack were collected for analysis by a specialized laboratory, using a circuit mounted therein, simulating the same operational route adopted by the plant of the invention.

The ore sample of the waste pile exhibited an extremely simple mineralogy, constituted essentially by iron-bearing minerals and by a non-magnetic fraction, wherein the iron-bearing materials are: magnetite, martite, hematite and by iron oxides and hydroxides, as shown hereinafter. The non-magnetic fraction is composed essentially by silica. The percentage of these minerals is shown in Table 2 below.

TABLE 2

| Minerals | Chemical formula | Weight % |
|---|---|---|
| Magnetite | $Fe^{2+} Fe_2^{3+} O_4$ or $Fe_3O_4$ | 18 |
| Martite | $Fe_3O_4 => Fe_2O_3$ | 15 |
| Hematite | $Fe_2O_3$ | 47 |
| Silica | $SiO_2$ | 15 |
| Iron Oxide and hydroxide | $Fe(OH)_2$ | 5 |

In the first test, a metallurgical recovery of 70.17% of total iron was obtained, which is quite high for the industry, the result of which can be seen in Table 3 below:

TABLE 3

First test of sample of waste

Chemical analysis

Head contents   Fe(T) = 42.09%

Granulometry

| Fraction | Weight | Weight % | % Fe | Fe count | Dist. Fe % |
|---|---|---|---|---|---|
| ≧5 mm | 180.0 | 4.85 | 44.52 | 2.16 | 5.06 |
| ≧3 mm | 120.0 | 3.23 | 55.25 | 1.79 | 4.19 |
| ≧1 mm | 220.02 | 5.93 | 59.77 | 3.54 | 8.30 |

TABLE 3-continued

| | | | | | |
|---|---|---|---|---|---|
| ≧325# | 2,170.0 | 58.59 | 37.14 | 21.72 | 50.50 |
| ≧325# | 1,020.0 | 27.49 | 48.98 | 13.47 | 31.55 |
| TOTAL | 3,710.0 | 100.00 | | 42.68 | 100.00 |

Magnetic Separation - High-Intensity Roll Magnetic Separator
Fraction −1 mm and +325 mesh

| Product | Weight | Weight % | % fe | Fe cont | Dist. fe % |
|---|---|---|---|---|---|
| Magnetic | 986.05 | 26.88 | 66.60 | 17.90 | 41.94 |
| Mixed | 32.44 | 0.88 | 50.24 | 0.44 | 1.04 |
| Non-Magnetic | 1127.31 | 30.73 | 10.99 | 3.38 | 7.91 |
| Totals | 2145.80 | 56.49 | | 21.72 | 50.89 |

The fraction −1 mm and +325 mesh contains 21.72% iron; a recovery of 41.94% relative to the sample was achieved;

Magnetic Separation - High-Intensity Roll Magnetic Separator
Fraction −325 mesh

| Intensity | Weight | Weight % | % Fe | Fe cont | Dist. Fe % |
|---|---|---|---|---|---|
| 1,000 gauss | 10.06 | 0.27 | 67.26 | 0.18 | 0.43 |
| 2,000 gauss | 28.42 | 0.77 | 68.09 | 0.52 | 1.22 |
| 4,000 gauss | 82.55 | 2.22 | 68.38 | 1.52 | 3.56 |
| 8,000 gauss | 331.10 | 8.92 | 68.40 | 6.10 | 14.30 |
| 16,000 gauss | 206.73 | 5.57 | 66.76 | 3.72 | 8.71 |
| non-magnetic | 361.14 | 9.73 | 14.56 | 1.42 | 3.32 |
| total | 1,020.00 | 27.49 | | 13.47 | 31.55 |

The fraction −325 mesh contains 31.55% of Iron; a recovery of 28.23% was achieved in this fraction.
RECOVERY % (fraction −1 mm +325 and −325 mesh) 70.17
The fraction +1 mm further containing 17.55% of the iron contained, which may be recovered in a high-intensity magnetic separator with differentiated gradient, is still to be processed.

The maximum recovery can reach 70.17%+17.55%=87.72%.

In order to prove the efficiency of the process, a new sample of larger volume was collected and processed.

After the processing, the following results were obtained:
Fraction higher than 6.35 mm achieved a recovery of 19.86% by weight, with Fe(T) contents of 63.75%, which corresponds to a metallurgical recovery of 26.33% of the iron contained;
Fraction lower than 6.35 mm and higher than 2 mm achieved a recovery of 11.85% by weight, with Fe(T) contents of 62.63%, which corresponds to a recovery of 15.44% of the iron contained;
Fraction lower than 2 mm and higher than 100 mesh with recovery 14.87% by weight and Fe(T) contents of 62.03%, which corresponds to a metallurgical recovery of 19.18% of contained iron;
Fraction lower than 100 mesh with recovery of 13.86 by mass and Fe(T) average contents of 68.72%, which corresponds to a metallurgical recovery of 19.80% of the iron contained.

Thus, in the second test, carried out according to the established flowchart, and a route simulating the invention, a recovery was achieved of 60.45% by weight with average Fe(T) contents of 64.23% and a metallurgical recovery of 80.75% of the iron contained, still higher than that obtained in the first test.

The results of the tests developed in laboratory attest the efficacy of the technological route of dry magnetic recovery of the present invention, in the processing of the "dump" from said pile of wastes. The results or the second test are shown in tables 4 (chemical grain analysis) and 5 (recovery table) below.

TABLE 4

Second test of waste sample

| Unit | 3.20% |
|---|---|
| | Chemical analysis |

| Head contents | Fe(T) = 48.08% |
|---|---|

GRANULOMETRY

| Fraction | Weight | Weight % | Fe % | Fe cont | Dist. Fe % |
|---|---|---|---|---|---|
| +¼" | 7,700.0 | 26.75 | 60.42 | 16.16 | 33.60 |
| −¼" and +2 mm | 3,700.0 | 12.85 | 59.73 | 7.68 | 1596 |
| −2 mm and +100 mesh | 5,230.0 | 18.17 | 53.16 | 9.66 | 20.08 |
| −100 mesh | 12,160.0 | 42.24 | 34.57 | 14.60 | 30.36 |
| TOTAL | 28,790.0 | 100.00 | | 48.09 | 100.00 |

Magnetic Separation - High-Intensity Roll Magnetic Separation Fraction +¼"

| Product | Weight | Weight % | Fe % | Fe cont | Dist. Fe % |
|---|---|---|---|---|---|
| Magnetic | 5,719.,80 | 19.87 | 63.75 | 12.67 | 26.33 |
| Mixed | 1,461.30 | 5.08 | 59.47 | 3.02 | 6.28 |
| Non-magnetic | 518.90 | 1.80 | 26.43 | 0.48 | 0.99 |
| Totals | 7,700.00 | 26.75 | | 16.16 | 33.60 |

Metallurgical recovery of Fe(T) in fraction −100 mesh of the Magnetic fraction = 16.33%
Fraction −¼" and +2 mm

| Product | Weight | Weight % | Fe % | Fe cont | Dist. fe % |
|---|---|---|---|---|---|
| Magnetic | 3,413.50 | 11.85 | 62.36 | 7.42 | 15.44 |
| Mixed | 114.60 | 0.40 | 40.35 | 0.16 | 0.33 |
| Non-magnetic | 171.90 | 0.60 | 15.11 | 0.09 | 0.19 |
| Totals | 3,700.00 | 12.85 | | 7.68 | 15.96 |

Metallurgical recovery of the Fe(T) in fraction −100 mesh of the Magnetic fraction = 15.44%
Fraction −2 mm and +100 mesh

| Product | Weight | Weight % | Fe % | Fe cont | Dist. fe % |
|---|---|---|---|---|---|
| Magnetic | 4,279.60 | 14.87 | 62.03 | 9.22 | 19.18 |
| Mixed | 132.10 | 0.46 | 25.22 | 0.12 | 0.24 |
| Non-magnetic | 818.30 | 2.84 | 11.27 | .032 | 0.67 |
| Totals | 5,230.00 | 18.17 | | 9.66 | 20.08 |

Magnetic recovery of Fe (T) in fraction −2 mm and +100 mesh of Magnetic fraction = 19.18%
Magnetic Separation - High-Itnensity Roll Magnetic Separatos Fraction −100 mesh

| Product | Weight | Weight % | Fe % | Fe Cont | Dist. Fe % |
|---|---|---|---|---|---|
| Magnetic | 3,990.00 | 13.86 | 68.72 | 9.52 | 19.80 |
| Mixed | 1,090.00 | 3.79 | 43.57 | 1.65 | 3.43 |
| Non-magnetic | 7,080.00 | 24.59 | 13.94 | 3.43 | 7.13 |
| Totals | 12,160.00 | 42.24 | | 14.60 | 30.36 |

TABLE 4-continued

Second test of waste sample

Metallurgical recovery of Fe(T) of Magnetic Fraction = 19.80% with iron contents = 68.72%
Metallurgical recovery of Fe(T) of Magnetic Fraction + Mixed = 22.23% with Fe contents = 63.32%

| | Weight % | Dist Fe(T) % |
|---|---|---|
| Total Iron Recovery in the Sample | 60.45% | 80.75% |

TABLE 5

Summary - Recovery Table

| Product | Weight | Weight % | Fe % | Fe cont | Dist. Fe % |
|---|---|---|---|---|---|
| Magnetic +¼" | 5,719.80 | 19.87 | 63.75 | 12.67 | 26.33 |
| Magnetic −¼" and +2 mm | 3,413.50 | 11.85 | 62.63 | 7.42 | 15.44 |
| Magnetic −2 mm and +100 mesh | 4,279.60 | 14.87 | 62.03 | 9.22 | 19.18 |
| Magnetic −100 mesh | 3,990.00 | 13.86 | 68.72 | 9.52 | 19.80 |
| Totals | 17,402.90 | 60.45 | 64.23 | 38.83 | 80.75 |

Moreover, during the tests carried out, the granulometry profile of the collected material was also determined, as shown in Table 6 below.

TABLE 6

Granulometry of the feed of the plant

| | Feed | | 250 |
|---|---|---|---|
| Sieve | Weight | Weight % | Ton/solids |
| Fraction +40 mm | 6.38 | 2.93 | 7 |
| Fraction +¼ | 42.87 | 19.72 | 49 |
| Fraction +2 mm | 46.71 | 21.48 | 54 |
| Fraction +100 mesh | 46.23 | 21.26 | 53 |
| Fraction +200 mesh | 15.45 | 7.10 | 18 |
| Fraction +325 | 35.21 | 16.19 | 40 |
| Fraction +400 mesh | 23.48 | 10.80 | 27 |
| Fraction +500 mesh | 1.11 | 0.51 | 1 |
| Fraction −500 mesh | 32.58 | 14.99 | 37 |
| Totals | 217.41 | 100.00 | 250 |

Although the present invention has been described with respect to its particular characteristics, it is clear that many other forms and modifications of the invention will be obvious to those skilled in the art.

The accompanying claims were drafted so as that they can cover such obvious forms and modifications, which will be within the scope of the present invention.

The invention claimed is:
1. A system for dry recovery of fine and superfine particles of oxidized iron ore, wherein the recovery is carried out in a totally dry metallurgical route, the system comprising:

a drying means with mechanical stirring, at least one set of cyclones arranged in series for air-sorting of fed material at different granulometric ranges; and magnetic separation using permanent high intensity rare earth roll separators capable of reaching up to 13,000 gauss arranged at a conveyor belt with an inclination that actuates over the inertial reference of non-magnetic fine-rained particles of oxidized iron-ore and prevents their dragging with a magnetic fraction and contamination of a oxidized iron ore concentrate.

2. A system according to claim 1, wherein the metallurgical route further comprises a complementary systems for material feed, preliminary reduction of ores, transport, storage, sieve sorting, sleeve filters.

3. A system according to claim 1, wherein stacks are provided for stocking oxidized iron-ore.

4. A process for dry recovery of fines and superfines of oxidized iron ore, comprising the steps of:
   (a) drying and disaggregating the ore by mechanical stirring;
   (b) selective air-sorting on the basis of the granulometry of the material in a serial cycloning operation; and
   (c) magnetically separating by means of permanent high intensity rare earth roll separators operating with a magnetic intensity that can reach up to 13,000 gauss and arranged at a conveyor belt with an inclination that actuates over an inertial reference of non-magnetic fines of oxidized iron ore and prevents their dragging with a magnetic fraction and contamination of the oxidized iron ore concentrate.

5. A process according to claim 4, further comprising a step of transferring the ore to a storage area for drying or disaggregation by a conveyor belt through a duct provided with a shaking feeder.

6. A system according to claim 1 wherein the permanent high intensity rare earth roll separators each comprise magnets of north polarity with an intermediate gap, followed by magnets of south polarity with an intermediate gap, with a magnet-thickness:gap-thickness ratio of 3:1.

* * * * *

UNITED STATES PATENT AND TRADEMARK OFFICE
CERTIFICATE OF CORRECTION

| | |
|---|---|
| PATENT NO. | : 9,327,292 B2 |
| APPLICATION NO. | : 14/386574 |
| DATED | : May 3, 2016 |
| INVENTOR(S) | : Mauro Fumyo Yamamoto |

It is certified that error appears in the above-identified patent and that said Letters Patent is hereby corrected as shown below:

In the Claims

Claim 1, column 13, line 8, "rained" should be --grained--.

Signed and Sealed this
Twelfth Day of July, 2016

Michelle K. Lee
*Director of the United States Patent and Trademark Office*